United States Patent [19]

Banks

[11] 4,386,368
[45] May 31, 1983

[54] MEMORY CONSERVATION METHOD IN A PROGRAMMABLE ROM SYNC GENERATOR SYSTEM

[75] Inventor: Arthur J. Banks, Cherry Hill, N.J.

[73] Assignee: RCA Corporation, New York, N.Y.

[21] Appl. No.: 306,605

[22] Filed: Sep. 29, 1981

[30] Foreign Application Priority Data

Apr. 1, 1981 [GB] United Kingdom ............... 8110218

[51] Int. Cl.³ .............................................. H04N 5/06
[52] U.S. Cl. .................................... 358/150; 358/151
[58] Field of Search ............................. 358/150, 151

[56] References Cited

U.S. PATENT DOCUMENTS

| | | | |
|---|---|---|---|
| 4,169,659 | 10/1979 | Marlowe | 358/150 |
| 4,280,138 | 7/1981 | Stock | 358/150 |
| 4,316,219 | 2/1982 | Smith | 358/150 |
| 4,328,513 | 5/1982 | Furihata | 358/150 |

*Primary Examiner*—Michael A. Masinick
*Attorney, Agent, or Firm*—E. M. Whitacre; W. H. Meise; H. I. Steckler

[57] ABSTRACT

A television synchronization generator has a clock generator driving a ROM. The ROM has stored in it the required sync signals. In order to conserve the ROM size, the ROM is addressed by a counter except during portions of the sync signals when the amplitude remains a constant. During these portions the counter continues to count.

6 Claims, 2 Drawing Figures

MEMORY CONSERVATION METHOD IN A PROGRAMMABLE ROM SYNC GENERATOR SYSTEM

BACKGROUND OF THE INVENTION

This invention relates to a TV Sync Generator system in which ROMs (read only memories) are used to determine the timings of the various output pulses and more particularly to a method of conserving memory required in the ROMs.

U.S. Patent Application Ser. No. 169,680 filed July 17, 1980 in the name of T. R. Smith and F. J. Marlowe, now U.S. Pat. No. 4,316,219, and assigned to the assignee of the present invention discloses a television synchronizing circuit that uses two counters respectively reading two ROMs to synthesize the horizontal and vertical synchronizing signals respectively. The clock period for the vertical ROM is one half-line interval, and the basic counted interval is one field. In NTSC and PAL M systems the field interval is 525 half-lines; in PAL B and SECAM systems it is 625 half-lines. Consequently, in the above mentioned application, the minimum number of addresses required in the vertical ROM is 525 or 625, respectively. Further, a particular design for a 525 or 625 line camera requires six output lines. In particular they are: one output to establish the gating of equalizing pulses, one for a vertical cursor signal used to establish a center area for automatic white balance, one for vertical drive, one for a signal called "advanced vertical" used in PAL to establish a four field sequence, one for vertical blanking, and finally an internal vertical reset pulse to reset the vertical counter after 525 or 625 lines.

If the generator is to be used in a portable camera which is battery operated, then the power consumption of the ROM becomes an important factor. Therefore a CMOS (complementary metal oxide semiconductor) ROM could be used for low power consumption. Further, the ROM should be an EPROM (erasable programmable read only memory) to allow use with either PAL or NTSC by reprogramming, and to allow for different vertical blanking intervals within one standard at the option of the user.

Commercially available EPROMs come with a number of addresses which number is a power of 2, and the smallest power-of-2 number useable is 1024. A suitable CMOS device with 1024 addresses is type No. IM6653 made by Intersil Inc. However, it has only 4 output lines (1024×4 bits). As explained above, the sync generator design for a 525 or 625 line camera requires six output lines. This means that two of said devices would be required for the vertical ROM, thereby increasing the cost, power and required space. Another possibility is to try to use a single device, such as the Intersil IM6654, which has 512 address and 8 output lines. This is more than adequate in number of output lines, but insufficient in number of addresses.

It is desirable to provide a television synchronization generator that has low space, cost and power consumption and is adaptable to different standards. More particularly, to provide such objectives with a synchronization generator having a single 512 address vertical ROM.

SUMMARY OF THE INVENTION

A television synchronization signal generator for generating at least one synchronizing signal having at least one time interval during which the amplitude of said signal remains a constant, said generator comprising memory means for storing amplitude information of said signal at each of a predetermined plurality of sampling points; clock signal generating means coupled to said memory means for generating periodic sampling signals for recurrently clocking said memory means for reading said information from said memory for generating said synchronization signal; and counter means coupled to said clock signal generating means and to said memory means for determining said one time interval from said sampling signals and for addressing said memory means except during at least said one time interval.

DETAILED DESCRIPTION

Figure 1:
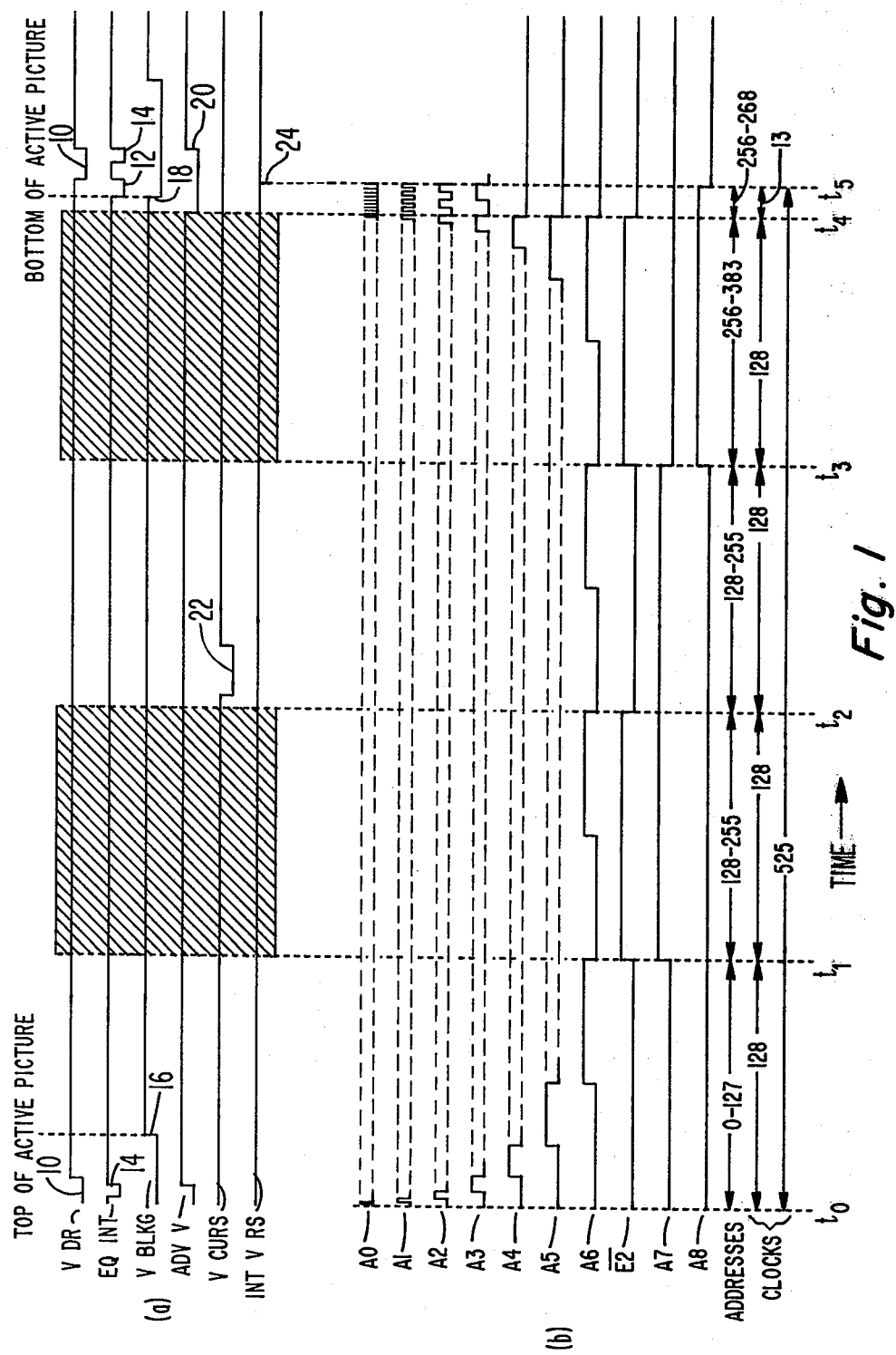
FIG. 1 is a timing diagram of waveforms used in the invention.

FIG. 1(a) shows the data that must be stored in the vertical ROM for a 525-line camera system. They will be discussed from top to bottom. The vertical drive (V DR) is applied to vertical synchronization circuits of the camera. Synchronization occurs during the negative portion 10 of this signal. When the equalizing interval signal (EQ INT) is negative (portions 12 and 14) 6 equalizing pulses are inserted into the video signal to form the proper composite waveform. The vertical blanking (V BLKG) signal has a positive going edge 16 that defines the top of the active picture and a negative going edge 18 that defines the bottom of the active picture. Typically V BLKG has a blanking period of 21 lines. A narrower blanking period can be used internally in the camera, since certain operations such as editing involving video storage and odd/even field changing may widen this period. When the final signal is transmitted, a standard blanking signal results or is substituted for the one generated by the invention. A negative advanced vertical (ADV V) pulse 20 is used in PAL for the purpose stated above. The vertical cursor pulse 22 (V CURS) is used to gate horizontal rate cursor pulses. The internal vertical reset pulse 24 (INT V RS) occurs at the far right of FIG. 1(a) at time $t_5$.

Note that except for the V CURS pulse, which is at the center of a field, the other pulses are clustered at the beginning and end of each field. All waveforms continue without change across the shaded intervals ($t_1$–$t_2$ and $t_3$–$t_4$). Therefore, operation of the ROM can be "idled" during these intervals. That can be accomplished by holding an $\overline{\text{ENABLE}}$ input ($\overline{E2}$) of an IM6654 ROM high during these intervals, because when $\overline{E2}$ goes high the ROM holds the last applied address. Thus, the data at that address is re-read by each clock until the $\overline{E2}$ input goes low again and starts to latch new addresses. These intervals are chosen for convenience to be 128 clock intervals each. Therefore, only 525-(2×128)=269 addresses in the ROM are required. In a 625 line systems (not shown in FIG. 1), the required number is 625-(2×128)=369 addresses. Other differences for a 625 line system would include reprogramming the ROM for groups of five equalizing pulses (instead of six) and typically 25 lines of vertical blanking (instead of 21).

FIG. 1(b) shows ROM address waveforms A0 through A8 together with the $\overline{E2}$ signal (between A6 and A7), the addresses (after A8), and at the bottom the number of clock pulses in various intervals. Observation of the address waveforms A0-A8 reveals that the count progresses from 0-255 from $t_0$-$t_2$ and then steps back to 128 at $t_2$ and counts up to 383 at $t_4$, then steps back to 256 and resumes again. At $t_5$ reset pulse 24 resets the counter and $t_0$ again occurs. As far as the ROM is concerned, the addresses during the two shaded intervals do not matter, but the first address after each shaded interval is one count higher than the last before the interval.

Note that even though it is not necessary to address the ROM during the shaded intervals, it is necessary for the counter to continue counting in order that these idle intervals be of measured duration.

Figure 2:
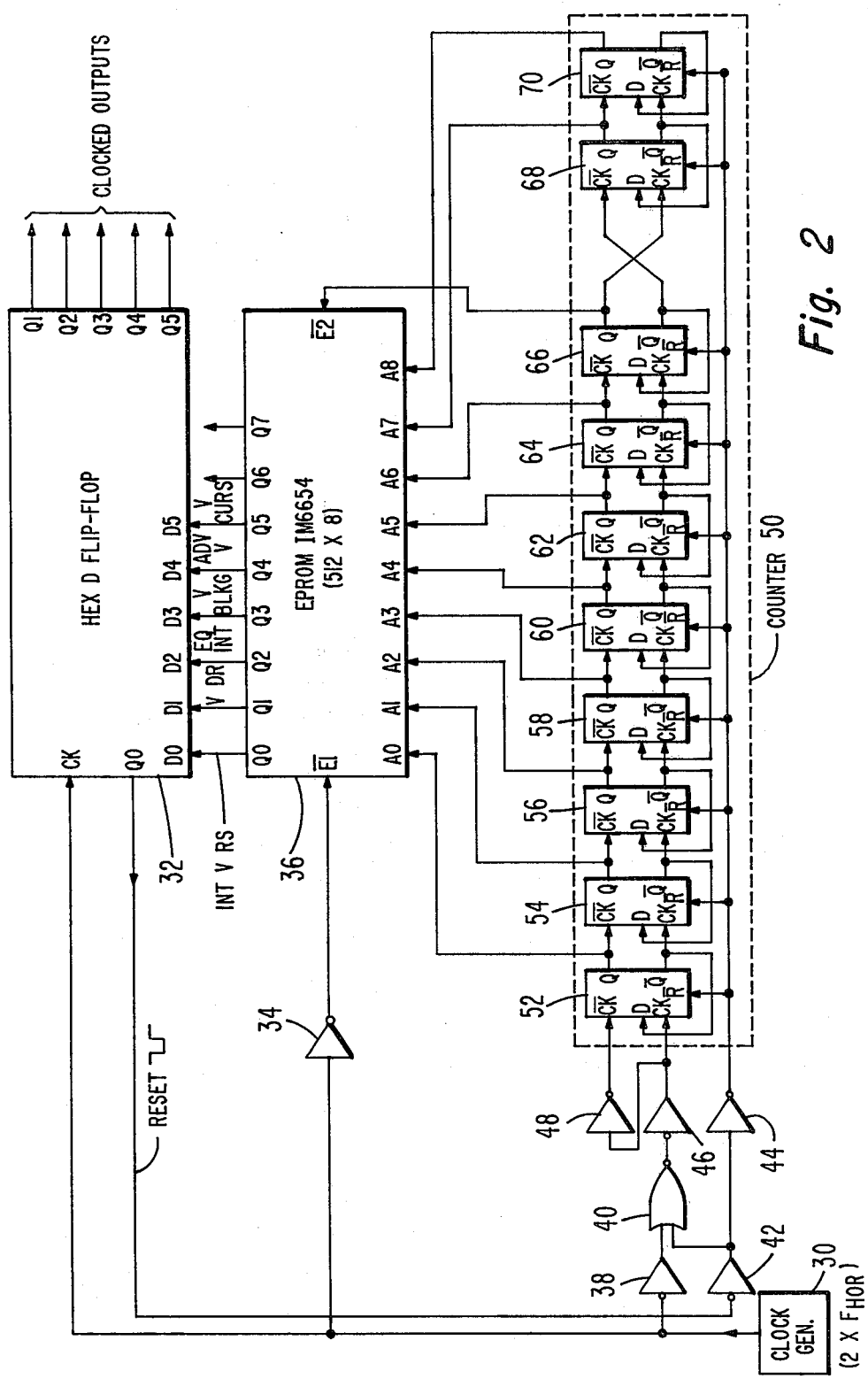
FIG. 2 is a block diagram of an embodiment of the invention.

FIG. 2 shows an embodiment of the invention for producing the waveforms of FIG. 1(a). A twice line frequency clock signal is generated by clock generator 30. A signal of such a frequency is required since an integral number of half lines per field (525 for NTSC or PAL-M) must be counted and a twice horizontal frequency clock changes every half line. The clock signal is applied to a common clock input CK of a hex type-D flip-flop 32, such as RCA CD40174B, i.e. the unit 32 comprises 6 flip-flops, which flip-flops trigger on the positive-going edges of the clock signal. The clock signal is also applied to an inverter 34 whose output is coupled to enable input $\overline{E1}$ of EPROM 36, such as Intersil IM6654. Since input $\overline{E1}$ requires a negative signal to enable EPROM 36, positive portions of the clock signal enable EPROM 36 due to inverter 34. Further the clock signal is applied to inverter 38 whose output is coupled to a first input of NOR gate 40. The INT V RS signal from a Q0 output of hex flip-flop 32 is applied to inverter 42 whose output is coupled to a second input of NOR gate 40 and inverter 44. The output of gate 40 is coupled to inverter 46, which inverter's output in turn is coupled to inverter 48.

A binary counter 50 comprises ten type D sequential coupled flip-flops 52, 54, 56, 58, 60, 62, 64 66, 68, and 70. The outputs of inverters 46 and 48 are respectively coupled to the CK and $\overline{CK}$ inputs of flip-flop 52, while the output of inverter 44 is coupled to the $\overline{R}$ (not reset) inputs of all flip-flops 52 to 70. Since the CK input of flip-flop 52 requires a positive going transition to provide a change of state, and since there are an odd number of logic polarity inversions through units 38, 40 and 46, negative going transitions in the clock signal cause a change of state in flip-flop 52. Since the $\overline{R}$ inputs require negative going transitions to provide a reset of flip-flops 52-70, negative going transitions of the reset signal are required due to inverters 42 and 44. Further, these correspond to negative transitions of the signal INT V RS from EPROM 36.

The first eight stages 52-66 of binary counter 50 are connected as an up-counter. Up-counting results from the fact that each succeeding stage is clocked by the negative going transition of the Q output of the preceding stage (along with the positive going transition of the $\overline{Q}$ output). The Q outputs of the first seven stages respectively provide A0-A6, and the Q output of the eighth stage 66 provides $\overline{E2}$. The A7 waveform is obtainable from the ninth stage 68 by crossing the Q and $\overline{Q}$ outputs from the stage 66 to feed the CK and $\overline{CK}$ inputs respectively of stage 68. Thus the transitions in A7 correspond to upward transitions in $\overline{E2}$. The tenth stage 70 is connected to the ninth stage 68 outputs without crossing; this makes the A8 transitions correspond to negative transitions in A7. Note in the penultimate line of FIG. 1(b), that the total number of clock periods in one field comprises 4 intervals each of 128 clock pulses plus 13 additional clock pulses ($t_1$-$t_5$) totaling 525 half line clock pulses.

The same circuit configuration can be applied to a 625-line system, wherein there will be 4 intervals of 128 clock pulses puls 113 additional clock pulses totaling 625. In this case, the V CURS pulse of FIG. 1(a) will move toward the right, but still be contained between the two shaded intervals, and the pulses following the second shaded interval will move toward the right.

EPROM 36 has outputs Q0 through Q5 that are respectively coupled to inputs D0 through D5 of hex flip-flop 32 and respectively provide signals INT V RS, V DR, EQ INT, V BLKG, ADV V, and V CURS. Outputs Q6 and Q7 are unneeded as was explained above. Hex flip-flop 32 latches and reclocks the above signals and provides them at outputs Q0 through Q5 respectively.

It will be appreciated that many other embodiments are possible within the spirit and scope of the invention. For example, this same principle of memory conservation could also be applied to the horizontal ROM in the above mentioned prior patent application.

What is claimed is:

1. A television synchronization signal generator for generating at least one synchronizing signal having at least a first time interval during which the amplitude of said signal remains a constant, said generator comprising memory means for storing amplitude information of said signal at each of a predetermined plurality of memory locations;

clock signal generating means coupled to said memory means for generating periodic sampling signals for recurrently clocking said memory means for reading said information from said memory for generating said synchronization signal; and counter means coupled to said clock signal generating means and to said memory means for determining said first time interval from said sampling signals and for addressing said memory means except during at least said first time interval.

2. A generator as claimed in claim 1, wherein said synchronizing signal has a second time interval during which the amplitude remains a constant, said counter means determining both of said intervals and addressing said memory except during both of said intervals.

3. A generator as claimed in claim 1, wherein said generator generates a plurality of synchronizing signals, said first time interval being common to all of said synchronizing signals with all of the synchronizing signal amplitudes being constant.

4. A generator as claimed in claim 3, wherein said plurality of synchronizing signals further have a second common interval during which the respective amplitudes remain constant, said counter means determining both of said intervals and addressing said memory means except during both of said intervals.

5. A generator as claimed in claim 3, wherein said synchronizing signals respectively comprise internal vertical reset, vertical drive, equalizing interval signals, vertical blanking, advanced vertical, and vertical cursor.

6. A generator as claimed in claim 1, further comprising latching means coupled to said memory means.

* * * * *